United States Patent [19]

Barthelemy

[11] 4,285,817

[45] Aug. 25, 1981

[54] DISC SECTOR

[75] Inventor: Kenneth E. Barthelemy, West Warwick, R.I.

[73] Assignee: Albany International Corp., Menands, N.Y.

[21] Appl. No.: 99,550

[22] Filed: Dec. 3, 1979

[51] Int. Cl.³ .............................................. B01D 33/00
[52] U.S. Cl. ................................... 210/486; 210/331; 210/455
[58] Field of Search ............... 210/247, 328, 331, 332, 210/333 R, 359, 391, 396, 397, 455, 486, 487, 541

[56] References Cited

U.S. PATENT DOCUMENTS

| | | | |
|---|---|---|---|
| 3,471,026 | 10/1969 | Riker | 210/486 X |
| 3,473,669 | 10/1969 | Davis et al. | 210/486 |
| 3,539,050 | 11/1970 | Davis et al. | 210/486 |
| 4,203,846 | 5/1980 | Barthelemy | 210/486 |

FOREIGN PATENT DOCUMENTS

646031 7/1962 Canada ...................................... 210/331

*Primary Examiner*—Charles N. Hart
*Assistant Examiner*—David R. Sadowski
*Attorney, Agent, or Firm*—Kane, Dalsimer, Kane, Sullivan & Kurucz

[57] ABSTRACT

A sector for a disc-shape filter including a substantially sector-shape element having a pair of opposed sides and a pair of opposing edges including a leading and a trailing edge converging towards each other and terminating in a neck at one end and diverging in the other direction to terminate in an arcuate outer edge. An arrangement of flow paths is on each side and positioned to direct filtrate toward the neck. The element is adapted to be interconnected with a plurality of similar sectors to form a disc-shaped filter and adapted to be interconnected with a source for pressure differential so that when a filter medium is mounted thereon, filtrate collected therethrough will be directed to the neck for removal. The flow paths are in a predetermined non-symmetrical arrangement of channels in the outer surface of each side with the channel arrangement adjacent the leading edge being different from the channel arrangement adjacent the trailing edge. A greater number of channels end adjacent the arcuate outer edge between the center line of the element and the trailing edge than between the center line of the element and the leading edge. The channels are of predetermined size to facilitate accommodations of different amounts of filtrate on different portions of the element and maintain a predetermined pressure differential condition as the element passes through the material to be filtered and to provide streamline and low turbulence flow through the channels with controlled direction and without significant back-flow between channels.

11 Claims, 5 Drawing Figures

DISC SECTOR

BACKGROUND OF THE INVENTION

A common filtering procedure is to form a filter wheel or disc made up of individual sectors which is designed to be passed in a rotational manner through a container of material to be filtered. A filter material in the form of a bag is mounted on the sectors and a source of suction is provided to draw the filtrate through the filter bag leaving a cake of residue on the bag surface. At a predetermined time and location, fluid is forced into the interior of the bag to drive the cake from the exterior of the filter bag.

The various types of available filters of this nature are designed to provide a quick and efficient means for removing the filtrate as it is drawn through the filter material. One way of accomplishing this is to provide a series of grooves in the surface of the supporting structure or sectors which direct the filtrate to a drainage opening where it is removed. A recent example of a system of this type is present in U.S. Pat. No. 3,917,534.

Other patents which further define the general state of the background art in regard to filtering systems and particularly disc-like filtering systems appear in U.S. Pat. Nos. 2,601,633; 2,902,164; 3,398,833; 3,473,669; 3,471,026, 3,539,050; and Canadian Pat. No. 646,031.

While the state of the art is highly developed, there is still room for improvement of flow characteristics during removal of the filtrate so that a more efficient and streamline flow with low turbulence can be obtained. It is also of importance, in addition to improving the flow characteristics of removal of the filtrate and eliminating the occurrence and amount of back-flow, that the disc sectors be formed of low cost material and in an inexpensive and efficient manner to facilitate assembly and mounting and removal of filter bags when the disc is being used in the filtering operation.

A significant advancement in this regard is present in my previously filed application Ser. No. 899,076 filed Apr. 24, 1978, now U.S. Pat. No. 4,203,846, the contents of which are incorporated herein by reference. The present invention includes further improvements to the state of the art.

SUMMARY OF THE INVENTION

With the above background in mind, it is among the primary objectives of the present invention to provide an improved disc sector for use in a disc-shaped filter assembly wherein the surface is exposed to the filtrate are formed with an improved arrangement of channels to enhance and streamline the flow characteristics of the filtrate being removed and to reduce turbulence and accordingly reduce back-flow and back pressure in the filtering system.

In this respect, an arrangement of channels are provided on the sector-shaped faces of the disc sector and are in the form of radial depressions of predetermined size in side by side relationship. The channels terminate at an exit opening at the neck portion of the sector and a predetermined number of adjacent pairs of channels converge so that they meet and form one channel a predetermined distance from the neck thereby reducing the number of channels at the neck end from the number of channels adjacent the arcuate outer edge of the sector.

The channels are arranged in a non-symmetrical pattern about the center line of the sector so that as the sector is positioned on the disc and the disc is rotated in a predetermined direction, the flow characteristics of the trailing edge are favored over the leading edge in that there are less single channels adjacent the leading edge. That is, more of the adjacent pairs of channels near the leading edge converge into a single channel short of the neck than the channels adjacent the trailing edge. With this pattern, the direction of flow from the end of the channels into the neck is such that the leading edge is restricted by a more direct flow of filtrate being directed from the trailing portion of the sector across the leading edge flow as the sector exits from the container holding the medium being filtered.

Additionally, there are a greater number of channels ending adjacent the arcuate outer edge between the center line of the element and the trailing edge than between the center line of the element and the leading edge. This is a further structural means of obtaining the desired flow characteristics as discussed.

It is contemplated with the present channel arrangement that a large number of independent exit channels are provided so that streamline flow is promoted as well as control of flow direction and alleviation of the danger of back-flow between channels. In the depicted embodiment, there are 32 channels starting adjacent the arcuate outer edge and converging in a predetermined pattern so that there are still 19 independent exit channels.

When the leading edge channels empty of filtrate some of the vacuum is lost throughout the sector due to introduction of air through the cake. Therefore, the trailing portion fails to load as effectively as the leading portion. The confluence of two or more leading edge channels into a single exit channel helps to retard the escape of the filtrate as the sector rotates out of the bath. The presence of the filtrate in the leading edge channels acts as a seal so that the vacuum required to properly load the trailing edge is not diminished. Also, the angle of the trailing edge channels and their non-restricted exits are designed to allow the filtrates therein to rapidly express into the neck across the drainage flow of the leading edge channels and in this manner further impede the flow from the leading edge channels.

The action of the arrangement of channels also assists in restricting the drying of the leading edge so that air is not pulled through and thus cause loss of some vacuum on the trailing edge which causes the trailing edge to dry more slowly than the leading edge.

It is also contemplated that the present sector structure can be formed of a molded plastic material such as an inexpensive plastic as polyurethane or polyurethane with a plastic foam core of a thermoset material. The sector is formed of two pieces, one being a hollow plastic neck portion of material such as polyurethane and the other piece being a main sector body portion containing the grooved sides and formed of a polyurethane skin and a plastic foam interior. The two pieces are designed to be snap locked together with appropriate projections on one of the pieces and recesses on the other with the natural resilience of the plastic permitting the snap fit so that the channels are in alignment with the hollow interior of the neck and to the exit opening from the neck. The snap-lock feature provides for smooth transition to the neck outlet and prevents turbulence and wear as well as allowing for improved fitting of the filter bags over the two piece sector design.

Furthermore, the plastic sector is formed with an arcuate edge opposite to the neck portion and the portion of the sector adjacent to the edge is flat and grooveless to allow for stapling of the filter bag directly into the sector. This provides for better bag installation, for example by a reduction in bulges in the assembled system.

In summary, a sector is provided for a disc-shaped filter. The sector includes a substantially sector-shaped element having a pair of opposed sides and a pair of opposing edges including a leading edge and a trailing edge converging toward each other terminating in a neck at one end and diverging the other direction to terminate in an arcuate outer edge. An arrangement of flow paths is on each side and is positioned to direct filtrate toward the neck. The element is adapted to be interconnected with a plurality of similar sections to form a disc-shape filter and adapted to be interconnected with pressure differential means so that when a filter medium is mounted thereon, filtrate collected therethrough will be directed to the neck for removal. The flow paths are in a predetermined non-symmetrical arrangement of channels in the outer surface of each side. The channel arrangement adjacent the leading edge is different from the channel arrangement adjacent the trailing edge. A greater number of channels are adjacent the arcuate outer edge between the center line of the element and the trailing edge than between the center line of the element and the leading edge. The channels are of predetermined size to facilitate accommodation of different amounts of filtrate on different portions of the element and maintain a predetermined pressure differential condition as the element passes through the material to be filtered and to provide streamline and low turbulence flow through the channels with controlled direction and without significant back-flow between channels.

With the above objectives among others in mind, reference is made to the attached drawings.

DETAILED DESCRIPTION

Figure 3:
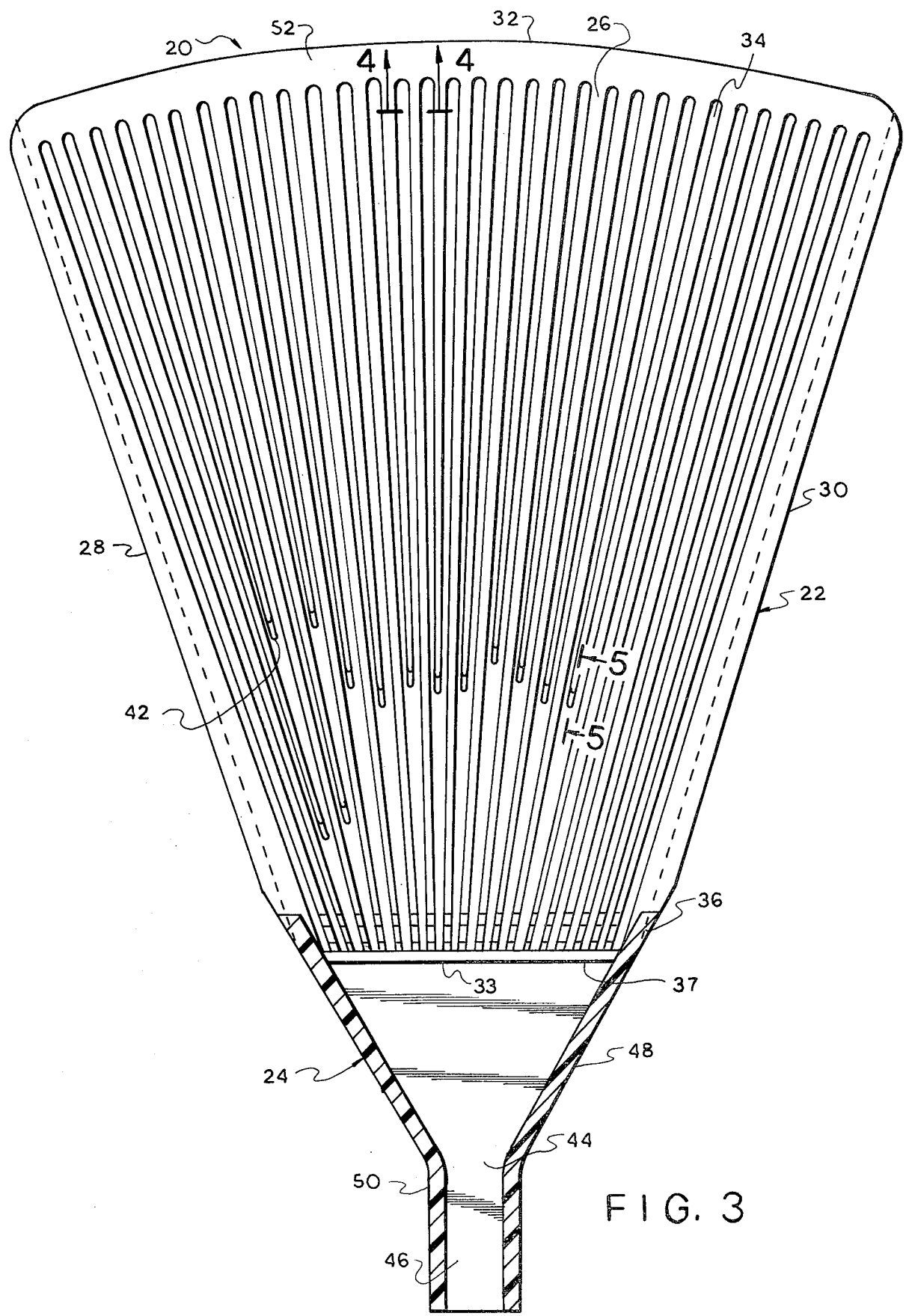
FIG. 3 is a plan view of one side of a disc sector of the invention.

Disc sector 20 as depicted in FIG. 3 includes a sector-shaped main body portion 22 interconnected with a neck portion 24. Each body portion includes a pair of opposing sector-shaped identical sides 26 spaced from one another so that a pair of opposing side edges 28 and 30 are formed along with an outer arcuate edge 32. The inner edge 33 is interconnected with neck 24.

The space between sides 26 is formed of a plastic foam material and the outer surface forming the surface or skin forming the sector sides and edges as well as the neck is formed of a conventional plastic material such as polyurethane.

The sides 26 are provided with a plurality of radially extending grooves in side by side relationship. In the depicted embodiment there are 32 grooves starting adjacent to arcuate outer edge 32 and a number of adjacent paths of the grooves converge to form lesser grooves adjacent to edge 33 interconnected with neck 24. In the embodiment depicted the 32 grooves converge into 19 grooves or channels entering the neck.

The neck is formed as a hollow plastic member formed of a material such as polyurethane and has a wider forward end 36 terminating in a substantially rectangularly shaped mouth 37 of somewhat rectangular configuration to receive the smaller rear end of the body portion 22 of the sector therein. Interconnection therebetween is achieved by means of a snap-lock arrangement. A plurality of notches are formed in the walls forming the channels adjacent to rear edge 33. These notches are in alignment for interengagement with a projecting portion adjacent the mouth 37 of the neck. The resilient nature of the plastic material of the sector permits the application of force, when the body 22 is inserted into the mouth 37 of the neck to cause projections to snap into recesses thereby interlocking the sector parts in a manner that will not interfere with the flow through the sector. This interlocking feature allows for a smooth transition to the neck outlet and prevents turbulence and wear while allowing for an improved fitting of the filter bag to the assembly when in use.

A predetermined number of adjacent pairs of channels 34 converge to meet short of the inner edge 33 of sector body 22. The apexes 42 where two adjacent channels intersect are at 13 locations in the embodiment shown. The apexes or points of intersection of each of these shown adjacent pairs of channels are removed from inner edge 33 and provide improved flow characteristics as will be described in detail below. It should also be noted that the greater number of intersecting channels is adjacent to edge 28 rather than being symmetrically placed on the faces 26 of sector 20. The purpose of this arrangement will also be discussed in detail below.

Furthermore, a greater number of channels 34 begin adjacent to arcuate outer edge 32 between the center line of the face of the disc sector and edge 30 than between the center line of the face of the disc sector and edge 28. The purpose of this arrangement will also be discussed in detail below.

Neck 24 is hollow forming a chamber 44 therein which terminates in an open rear end 46 so that a through passageway exists between open rear end 46, inner chamber 44 and mouth 37 communicating with the channels 34 on the sides 26. The inner edge of body 22 is within neck 24 so that filtrate exiting from the channels 34 are in direct communication with the interior of the neck. This is true with respect to both sides 26 of sector body 22.

Figure 1:
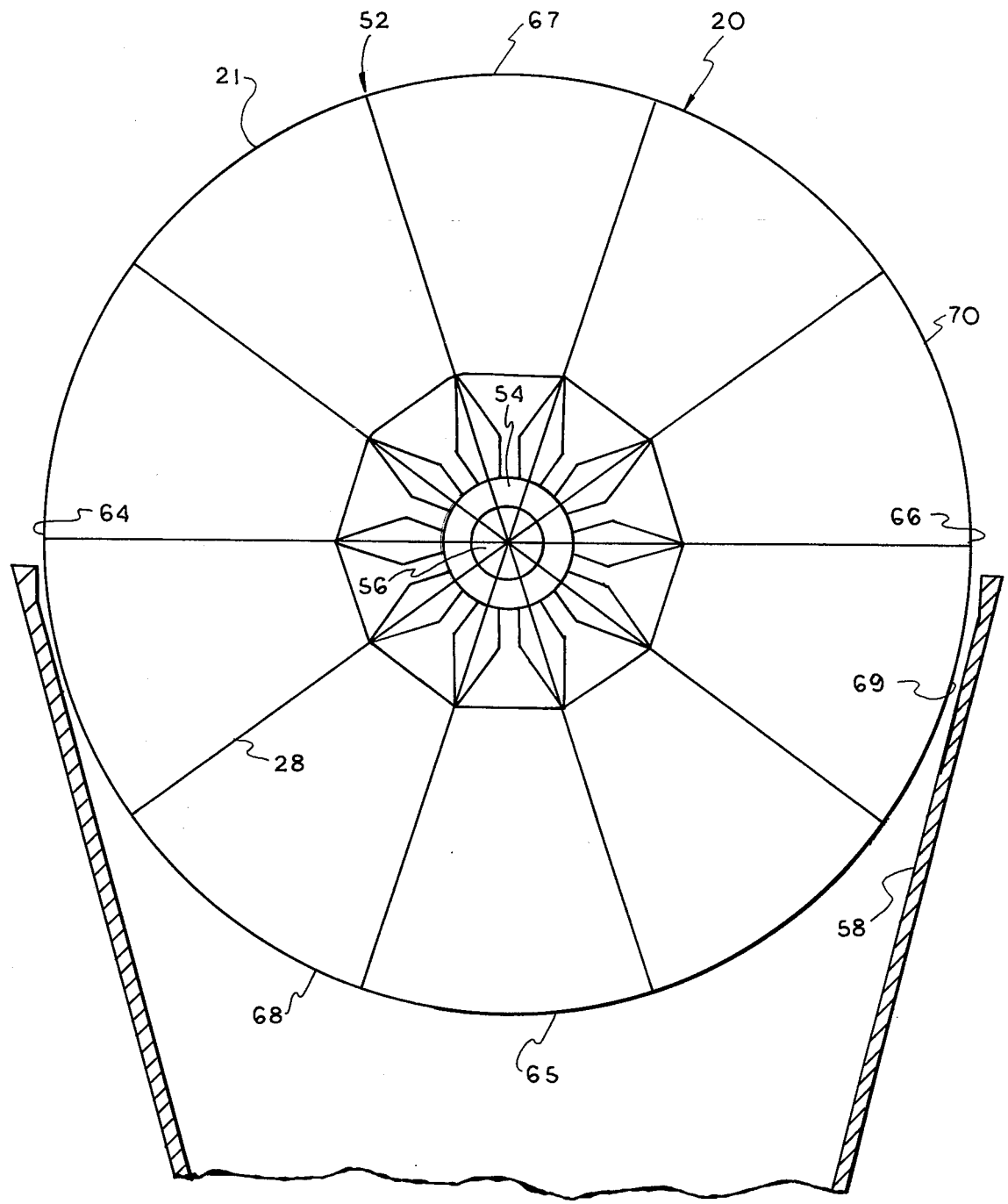
FIG. 1 is a sectional elevation view of a plurality of sectors of the invention formed into a filter disc assembly and mounted in filtering relationship with a container for material to be filtered.

Neck 24 has a wider forward portion 48 extending inwardly to a tubular neck 50 which is designed for interconnection with the remainder of disc filter assembly 52 as depicted in FIG. 1.

Another feature of the disc sector is the flat outer edge portion 52 adjacent to arcuate outer edge 32. This flat surface portion 52 on both sides 26 of the sector facilitates stapling of a filter bag directly into the sector thus providing for better bag installation, for example by a reduction in bulges on the assembly when it is in use.

Figure 2:
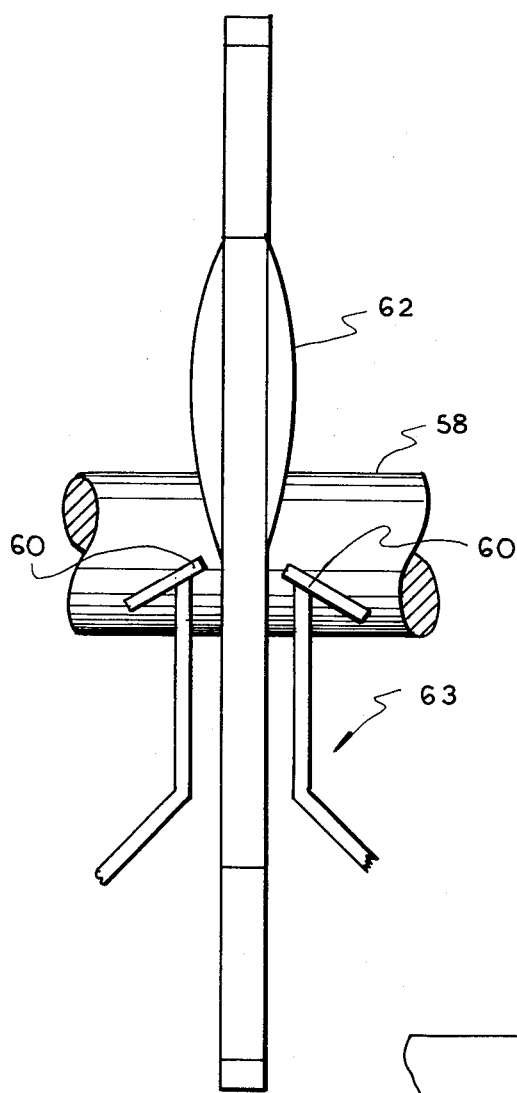
FIG. 2 is a fragmentary enlarged sectional view thereof showing the assembly in condition for removal of the cake formed on a filter bag on a segment after filtering and showing a scraper for removal of the cake from the expanded filter bag.
Figure 4:
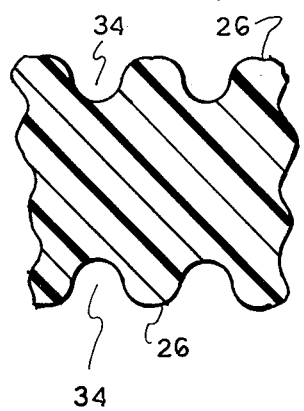
FIG. 4 is an enlarged fragmentary sectional view thereof taken along the plane of line 4—4 of FIG. 3.
Figure 5:
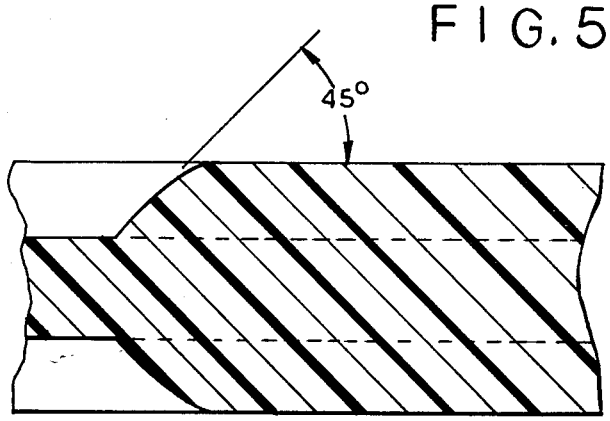
FIG. 5 is a fragmentary enlarged sectional view thereof taken along the plane of line 5—5 of FIG. 3.

In use, sectors 20 are mounted on a conventional disc filter assembly 52 as shown in FIG. 1. In the depicted form there are 10 sectors on assembly 52. Opening 46 in each neck of a sector 20 is in communication with a tubular passage network 54 extending in the horizontal direction. This passage network 54 surrounds a central shaft 56 connected to a suitable well known drive means (not shown) for rotating the disc during the filtering operation. The sectors 20 are dimensioned so that they fit side by side to form the complete disc 52. The disc is mounted in position so that approximately half extends into a vat or container 58 for holding the material to be filtered. After the filtering operation has been completed, the cake formed on the filter is to be removed from the filter bag by a snap-blow operation. As shown in FIG. 2, a cake scraper is mounted at a predetermined location about the circumference of the upper rim of vat 58. This cake scraper 60 is in position to engage with the inflated filter bag 62 to scrape the cake from the outer surface of the filter bag at which time the cake is in position to pass through a cake chute 63 adjacent to cake scraper 60.

The sectors are formed by snapping body portions 22 into the mouth 37 of neck 24 by means of the snap fit between projections and recesses. The sectors are then mounted in conventional fashion on the rotating disc filter assembly 52 so that there are 10 sectors in position for use. For descriptive purposes, the disc 52 of FIG. 1 will be described as rotating in a counter clockwise direction starting from a 0 degree point 64 on the horizontal thereby putting the 90 degree point of rotation 65 at the bottom of the disc, the 180 degree point 66 opposed to the 0 point on the horizontal and the 270 degree point 67 at the upper apex of the disc.

As the disc rotates there are three sections of activity through passage network 46 in regard to air-flow directed to and from the sectors through the openings 46 in their necks. During one period of rotation, there is no pressure applied, during a second period of rotation there is a suction or vacuum force applied and during a third period of rotation there is pressure applied. Naturally during the first portion of rotation, the sector is not in operation, during the vacuum portion of rotation, the sector is being used to collect filtrate through a filter bag applied thereon and during the pressure stage fluid is being supplied to expand the filter bag on the sector and snap-blow the bag outward so that the cake of residue thereon can be removed by the cake scraper 60.

The bags are applied to the sectors in conventional manner and as described above can be stapled in position with the assistance of the flat outer edge portion 52 on the sector. The filter bags are of a conventional nature for purposes of filtering the material being handled.

Each sector has a leading edge 28 and a trailing edge 30 as it is mounted in the disc and is rotated in a counter clockwise direction. When the leading edge 28 is at the 0 point 64 the trailing edge and the remainder of the sector is in the off position. As rotation occurs, after the leading edge 28 has passed approximately the 70 degree point of rotation 68 but before the trailing edge has passed that point, vacuum is applied through the passage network 46 to the sector and the filtering action including cake formation is initiated.

Continued rotation through vat 56 occurs until approximately the 150 degree point of rotation 69 when the leading edge 28 exits the slurry and the exposed cake from the filtering bag 62 begins to dry.

As the leading edge 28 moves above the horizontal or 180 degree position 66, gravity drainage begins. The filtrate received from the bag travels through the channels 34 adjacent the leading edge into the neck and through the conventional drainage channels.

At approximately the 185 degree point of rotation 70 with the leading edge in that position, the disc is fully exposed for cake drying. At this time, the arrangement of converging channels greater in number adjacent the leading edge 28 than at the trailing edge 30, the channels being non-symmetrical about the center line of sector 20, and the greater number of channels starting adjacent the arcuate outer edge between the center line of the sector and the trailing edge 30 all serve to enhance the draining action at the trailing edge. The flow characteristics of the trailing edge 30 are favored over the leading edge in that there are less single channels, that is non-intersecting channels between the arcuate outer edge and the neck between the center line and the leading edge than between the center line and the trailing edge. Also, there are of a larger number of channels starting adjacent the arcuate outer edge 32 between the center line of the sector face and the trailing edge 30 than between the center line of the sector face and the leading edge 28. Furthermore, the direction of flow from the end of the channels into the neck is such that the leading edge is restricted by the more direct flow of filtrate being directed from the trailing portion of the sector across the leading edge flow.

The large number of independent exit channels, for example 19 in the depicted embodiment aids in promoting streamline flow, control of flow direction in preventing back-flow between channels. Sector capacity for removal of filtrate is also enhanced by the large channel surface area of the numerous channels 34.

The overall effect of the channel arrangement is to provide more streamline flow and lower turbulence than previously obtainable through the sector neck as well as providing for less restriction of flow thereby reducing back pressure or turbulence thereby permitting the filtrate to exit faster. Additionally, desired various conditions are maintained over the entire sector area. This is particularly true in respect to the sector face as the leading edge portion leaves the medium and is exposed to air before the trailing edge portion. In order to facilitate premature drying of the leading edge portion and providing for a more uniform drying of the cake, the non-symmetrical face of the sector promotes a desired drainage pattern to accommodate for this drying effect as the sector moves progressively from the filter medium and in a rotational direction. Naturally gravity considerations are also kept in mind in respect to drainage conditions and flow rates. The effect of gravity is also kept in mind with respect to drainage activity as the sector rotates through 360 degrees.

The number of channels is a matter of choice with the above principals of channel arrangement kept in mind for providing the desired flow for drainage purposes. It is of course not necessary that each pair of adjacent channels be brought together in the depicted area of converging channels. For example alternate or randomly selective paths can be used.

As discussed above, the snap-lock between the sector body 22 and the neck 24 also assists in providing for smooth transition of the filtrate to the neck outlet. Turbulence is prevented as well as undue wear by this feature and the snap-lock allows for better improved fitting of the filter bag on the sector. As stated above, the stapling feature also enhances the mounting of a filter bag 62 onto the sector 20 for use. Drainage continues to occur until the leading edge 28 reaches approximately the 330 degree point of rotation 21 at which time the vacuum through passage network 46 is interrupted in a conventional well known manner by a blast of hot pressure air commonly known as "snap-blow" action which causes the filter bag 62 to expand as depicted in FIG. 2 and release the cake. The cake scraper 60 assists in removal of the cake and disposal thereof down through cake chute 63.

Shortly thereafter the leading edge 28 reaches the point of rotation at which shut-off occurs which is retained until the initiation of filtering action occurs during further rotation at approximately the 70 degree point 68 again. In this manner the disc continues to rotate and filtering on a continuous basis can be achieved. The sources of vacuum and pressure are not shown and any conventional well known system can be employed for these purposes. The switching between shut-off, pressure and vacuum conditions is also accomplished in a conventional manner.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A sector for a disc-shaped filter comprising:
a substantially sector-shaped element having a pair of opposed sides, a pair of opposing edges including a leading edge and a trailing edge converging toward each other and terminating in a neck at one end and diverging in the other direction to terminate in an arcuate outer edge;
an arrangement of flow paths on each side and positioned to direct filtrate toward the neck;
the element adapted to be interconnected with a plurality of similar sections to form a disc-shaped filter and adapted to be interconnected with pressure differential means so that when a filter medium is mounted thereon, filtrate collected therethrough will be directed to the neck for removal; and
the flow paths being a predetermined non-symmetrical arrangement of channels in the outer surface of each side with the channel arrangement adjacent the leading edge being different from the channel arrangement adjacent the trailing edge including a greater number of channels ending adjacent the arcuate outer edge between the center line of the element and the trailing edge than between the center line of the element and the leading edge and the channels being of predetermined size to facilitate accommodation of different amounts of filtrate on different portions of the element and maintain a predetermined pressure differential condition as the element passes through the material to be filtered and to provide streamlined and low turbulence flow through the channels with controlled direction and without significant back-flow between channels.

2. The invention in accordance with claim 1 wherein the sector is formed of molded plastic material.

3. The invention in accordance with claim 1 wherein the neck has a free end of narrow diameter with a passageway therethrough communicating with the hollow interior of a wider fustroconical portion of the neck, the end of the neck opposite to the narrower diameter portion forming an open mouth with means thereon for interconnection with the remainder of the sector with communicating passageways between the interior of the hollow neck and the channels in the sector so that filtrate can flow from the channels through the neck and out the open free end of the narrower diameter portion of the neck.

4. The invention in accordance with claim 3 wherein the narrower diameter portion of the neck is adapted for interconnection with pressure differential means.

5. The invention in accordance with claim 1 wherein the neck portion is interconnected with the remainder of the sector by means of a snap-lock therebetween, the neck and remaining sector portion being of somewhat resilient plastic material so that when the neck and remainder of the sector are forced into engagement the plastic will resiliently deform and permits projecting portions of one of the neck and remainder of the sector to deflect into recesses on the other of the neck and sector whereupon the tendency to return to their natural configuration will snap the plastic neck and remainder of the sector together in locked interengagement in position for smooth transition between the channels of the sector and the passageway through the neck and aiding in the prevention of turbulence and wear and providing a better fit for the filter medium onto the disc sector.

6. The invention in accordance with claim 1 wherein the portion of the sector adjacent the outer edge has a relatively smooth surface to facilitate stapling of the filter medium directly into the sector thereby resulting in an improved filter assembly with reduced bulges.

7. The invention in accordance with claim 1 wherein the channels are in the form of a plurality of radially extending depressions open to the neck and closed adjacent to the arcuate outer edge of the sector, a predetermined number of adjacent pairs of channels converging into a single channel intermediate the ends of the sector, the channels being positioned in a non-symmetrical arrangement about the center line of the sector with the flow characteristics of the trailing edge of the sector passing through the material to be filtered being favored over the leading edge in that there are less single channels on the leading edge side of the center line than on the trailing edge side thereof, the direction of flow from the end of the channels into the neck being such that the leading edge is restricted by the more direct flow of filtered medium being directed from the trailing portion of the sector across the leading edge flow as the disc sector is passing from the material being filtered.

8. The invention in accordance with claim 1 wherein in each side of the sector has 19 independent exit channels extending side by side and in a radial direction along the sector in communication with the neck portion thereof so as to promote streamline flow, control the flow direction and to prevent back-flow between channels, and the 19 independent exit channels being formed by a merger of a predetermined arrangement and number of 32 side by side radially extending channels adjacent the arcuate outer edge with a greater number of the 32 channels adjacent the arcuate outer edge being between the center line of the element and the trailing edge than the number between the center line of the element and the leading edge.

9. The invention in accordance with claim 1 wherein each channel is provided with a predetermined surface area to facilitate streamlined flow and low turbulence through the sector neck with the restriction of flow being minimized to reduce back pressure and allow the filtrate to exit faster.

10. The invention in accordance with claim 1 wherein the channels in each side of the sector are arranged in side by side radially extending direction and are open to the neck at one end, a plurality of pairs of side by side channels converging into a single channel in the direction toward the neck and meeting a predetermined distance from the neck thereby reducing the number of channels entering the neck at the neck end from the number of channels adjacent the arcuate outer edge.

11. The invention in accordance with claim 1 wherein the arrangement of channels and ultimate flow paths on the sides of each sector are arranged so that collection of filtrate adjacent the leading edge of the sector in its direction of rotation is restricted with respect to the collection thereof adjacent the trailing edge in order to preserve the desired pressure differential condition across the surface of each sector and particularly adjacent the trailing edge of the sector in the direction of rotation.

* * * * *